United States Patent
Miyata (10) Patent No.: US 7,267,362 B2
(45) Date of Patent: Sep. 11, 2007

(54) AIRBAG APPARATUS, MOTORBIKE WITH THE AIRBAG APPARATUS

(75) Inventor: Yasuhito Miyata, Shiga (JP)

(73) Assignee: Takata Corporation, Tokyo (JP)

(*) Notice: Subject to any disclaimer, the term of this patent is extended or adjusted under 35 U.S.C. 154(b) by 363 days.

(21) Appl. No.: 10/848,173

(22) Filed: May 18, 2004

(65) Prior Publication Data

US 2005/0029782 A1 Feb. 10, 2005

(30) Foreign Application Priority Data

Aug. 7, 2003 (JP) ............................ 2003-206528

(51) Int. Cl.
*B60R 21/233* (2006.01)

(52) U.S. Cl. ................ 280/729; 280/730.1; 280/743.1

(58) Field of Classification Search ................ 280/729, 280/730.1, 743.1
See application file for complete search history.

(56) References Cited

U.S. PATENT DOCUMENTS

| | | | | |
|---|---|---|---|---|
| 3,843,151 | A * | 10/1974 | Lewis | ......................... 280/736 |
| 4,805,930 | A * | 2/1989 | Takada | ........................ 280/739 |
| 5,195,774 | A * | 3/1993 | Morita | ......................... 280/731 |
| 5,249,824 | A * | 10/1993 | Swann et al. | ................ 280/729 |
| 6,022,046 | A * | 2/2000 | Isomura et al. | .......... 280/743.2 |
| 6,247,727 | B1 * | 6/2001 | Hamada et al. | .......... 280/743.2 |
| 6,283,499 | B1 * | 9/2001 | Nelsen et al. | ................ 280/729 |
| 6,382,664 | B1 * | 5/2002 | Hirano et al. | ............ 280/730.2 |
| 6,676,158 | B2 * | 1/2004 | Ishikawa | .................. 280/743.1 |
| 6,932,379 | B2 * | 8/2005 | Yamazaki et al. | ........ 280/730.1 |
| 6,971,666 | B2 * | 12/2005 | Akiyama et al. | ............ 280/729 |
| 7,040,655 | B2 * | 5/2006 | Igawa et al. | ................ 280/739 |
| 7,044,499 | B2 * | 5/2006 | Miyata et al. | ............ 280/730.1 |
| 2002/0067032 | A1 * | 6/2002 | Ishikawa | .................. 280/743.1 |
| 2003/0214122 | A1 * | 11/2003 | Miyata | ..................... 280/730.1 |
| 2003/0222438 | A1 * | 12/2003 | Nagatsuyu | ................ 280/730.1 |
| 2004/0007855 | A1 * | 1/2004 | Kurata et al. | ................ 280/729 |

FOREIGN PATENT DOCUMENTS

JP 2000-0335056 5/2002

* cited by examiner

*Primary Examiner*—Paul N. Dickson
*Assistant Examiner*—Timothy D. Wilhelm
(74) *Attorney, Agent, or Firm*—Fitch, Even, Tabin & Flannery (57) ABSTRACT

An airbag configuration technology which contributes to intensive protection of a rider of a motorbike in case of accident, and other technologies related thereto are provided. An airbag apparatus including an airbag which is deployed and inflated in a rider protecting area defined in front of the rider in case of a front collision, an inflator capable of supplying inflation gas into the airbag, and a rectifying cloth capable of adjusting the flowing state of inflation gas fed from the inflator and flowing within the airbag is mounted to a motorcycle as a motorbike.

20 Claims, 5 Drawing Sheets

Flow of inflation gas

Flow of inflation gas

FIG. 7

AIRBAG APPARATUS, MOTORBIKE WITH THE AIRBAG APPARATUS

FIELD OF INVENTION

The present invention relates to a configuration technology for an airbag apparatus to be mounted to a motorbike.

BACKGROUND OF INVENTION

Hitherto, there are various publicly known technologies for protecting a rider by mounting an airbag apparatus to a motorbike. For example, in a motorcycle, a technology in which an airbag stored in a case mounted to a vehicle body frame is deployed and inflated by inflation gas, and the rider is restrained thereby in case of a front collision is publicly known (for example, see Japanese Unexamined Patent Application Publication No. 2002-137777). In this technology, a possibility to provide a wide area to be protected by the airbag is proposed. However, in the case where the airbag apparatus is mounted to a vehicle body which is opened in all directions such as a motorbike, a further effective technology for ensuring restraint of the rider by the airbag is in strong demand.

SUMMARY OF THE INVENTION

In view of such circumstances, it is an object of the present invention to provide an airbag configuration technology which contributes to intensive protection of the rider of the motorbike in case of accident, and other technologies related thereto.

In order to achieve the above-described object, the invention is configured as described herein. The invention described herein may be applied to the configuration of the airbag apparatus to be mounted to various motorbikes. In this specification, the term "motorbike" widely includes saddle-riding type vehicles, that is, vehicles of the type in which the rider sits on the seat astride. For example, a motorcycle of a type in which a fuel tank is provided in front of the rider's seat and a scooter-type motorcycle in which a space is formed between the rider's seat and a handle-supporting head pipe are both included. In addition to the motorcycle, such vehicles that three or more wheels are provided and the rider sits on a saddle (such as a three-wheeler bike used for delivery of Pizza, a three- or four-wheeler buggy type bike having off-roadability), or even such vehicles that traveling is achieved on sleighs or with an endless caterpillars and the rider sits on a saddle, such as a snowmobile, are also widely included in the "motorbike".

In the invention according to a first form, an airbag apparatus to be mounted to a motorbike includes at least an airbag, inflation gas supply mechanism, and adjusting mechanism.

The airbag of the present invention is configured to be deployed and inflated in a rider protection area formed in front of the rider in case of a front collision of the motorbike. Inflation gas is supplied into the airbag via inflation gas supply mechanism. Typically, the inflation gas supply mechanism employed here is the one so-called an inflator. Inflation gas is supplied into the airbag by the actuation of the inflator, whereby the airbag is deployed and inflated while projecting toward the rider protection area formed in front of the rider.

The adjusting mechanism of the present invention has a function to adjust a flowing state of inflation gas supplied from the inflation gas supply mechanism and flowing in the airbag. In this specification, the term "flowing state" widely includes the quantity of state relating the flow of inflation gas, such as the direction of flow, the flow rate, and the pressure of inflation gas. For example, the adjusting mechanism of the present invention may be configured by providing a woven cloth for dividing the interior of the airbag or a cylindrical or bag-shaped member formed of the woven cloth in the interior of the airbag. Typically, the flow of inflation gas flowing in the airbag can be adjusted to a desired flowing state by providing directivity to the flow of inflation gas flowing in the airbag by the adjusting mechanism. Accordingly, the direction of deployment and inflation of the airbag can be controlled.

In the configuration aiming only to ensure deployment and inflation of the airbag by supplying inflation gas into the airbag, it is difficult to control the direction of deployment and inflation of the airbag. In contrast, with the configuration in which the flowing state of inflation gas in the airbag is adjusted by the adjusting mechanism as in the present invention, the airbag is ensured to be deployed and inflated finally as a matter of course, and in addition, how the airbag is deployed and inflated in the process can also be controlled. For example, by controlling the direction of deployment and inflation of the airbag, the mode of deployment and inflation of the airbag can be determined in accordance with the behavior of the rider in case of a front collision of the motorbike.

In particular, when the airbag apparatus is mounted to the vehicle body which is opened in all directions as the motorbike, the intensive protection of the rider in case of accident is achieved by controlling the direction of deployment and inflation of the airbag and controlling deployment and inflation in the direction toward the rider.

In addition to the configuration of the first form, according to the airbag apparatus of a second form, the adjusting mechanism is configured of a bag-shaped member. The bag-shaped member is a bag-shaped member to be stored in the airbag, and includes an inlet section and a discharge section. In the present invention, inflation gas supplied from the inflation gas supply mechanism is flown into the bag-shaped member through the inlet section, is flown in the space in the bag-shaped member, and is discharged toward the outside the bag-shaped member through the discharge section. Therefore, the direction of discharge (direction of injection) of inflation gas flowing through the discharge section toward the outside the bag-shaped member can be set to a desired direction by adjusting the position, number, shape, size (inner diameter), and so on, of the discharge section as needed. By redirecting inflation gas discharged from the bag-shaped member, the flowing state of inflation gas generated outside the bag-shaped member can be adjusted. For example, with a configuration in which the discharge section is oriented in the course of deployment and inflation of the airbag so that the airbag is initially deployed and inflated in the desired direction, the airbag is deployed and inflated via a desired deployment and inflation process. In addition, with a configuration in which a plurality of discharge sections are provided in the bag-shaped member, or with a configuration in which the size (inner diameter) of the discharge section is variously changed, the direction and timing of deployment and inflation of the airbag, and time required until inflation is completed can be desirably controlled.

With such configurations according to the invention of the second form, the flowing direction of inflation gas supplied from the bag-shaped member into the airbag can be adjusted by the provision of the bag-shaped member. Such bag-shaped member is practical since it is simple in structure, and can be mounted easily.

In addition to the configuration stated in the second form, the airbag apparatus of a third form is disposed behind the handle with respect to the vehicle body. The handle includes a set-back section, which extends laterally of the vehicle body of the motorbike, and set back in the direction intersecting with the lateral direction. The discharge section of the bag-shaped member is arranged so as to be oriented toward the set-back section within the airbag when the airbag is deployed and inflated. Accordingly, the airbag is inflated forward with respect to the vehicle body in an elongated shape in a state in which the extension laterally of the vehicle body is restricted, and is inflated through the set-back section of the handle. In the process of deployment and inflation of the airbag, the airbag is controlled, for example, to inflate in the sequence of forward with respect to the vehicle body, upward with respect to the vehicle body, and toward the rider. Accordingly, inflation toward the rider is restricted in the process of deployment and inflation of the airbag, and the airbag provides a sufficient drag for restraining the rider when the deployment and inflation of the airbag are completed, so that intensive protection of the rider is achieved.

With the configuration of the third form stated in the invention, a flow of inflation gas effective for achieving intensive protection of the rider can be generated in the airbag by disposing the discharge port of the bag-shaped member at the position corresponding to the set-back section of the handle.

In addition to the configuration of the second or third forms, according to the airbag of of a fourth form, the airbag and the bag-shaped member are mounted to the airbag apparatus body in a state of being joined with each other. For example, the bag-shaped member is joined to the airbag by stitching, and then the airbag is mounted to the airbag apparatus body. Accordingly, the number of components such as the reinforcing cloth for the airbag can be reduced in comparison with the case in which the airbag and the bag-shaped member are mounted to the airbag apparatus body individually, and assembling operation of the airbag can be simplified.

The invention of a fifth form is defined as a motorbike to which the airbag apparatus according to any one of the first to fourth forms is mounted. Therefore, according to the present invention, the mode of deployment and inflation of the airbag can be set corresponding to the behavior of the rider in case of a front collision of the motorbike by adjusting the flowing state of inflation gas flowing within the airbag of the airbag apparatus by the adjusting mechanism, whereby intensive protection of the rider in case of accident is achieved.

When the adjusting mechanism is configured by the use of the bag-shaped member to be stored in the airbag, the flowing direction of inflation gas supplied from the bag-shaped member into the airbag can be adjusted. In addition, such the bag-shaped member is practical since it is simple in structure and can be mounted easily.

When the discharge section of the bag-shaped member is disposed at a position corresponding to the set-back section of the handle, it is effective to generate a flow of inflation gas effective for intensive protection of the rider within the airbag.

When the airbag and the bag-shaped member are mounted to the airbag apparatus body in a state of being joined with each other, the number of components such as a reinforcing cloth for the airbag can be reduced and assembling operation of the airbag can be simplified in comparison with the case in which the airbag and the bag-shaped member are mounted to the airbag apparatus body individually.

DETAILED DESCRIPTION OF THE PREFERRED EMBODIMENTS

Figure 1:
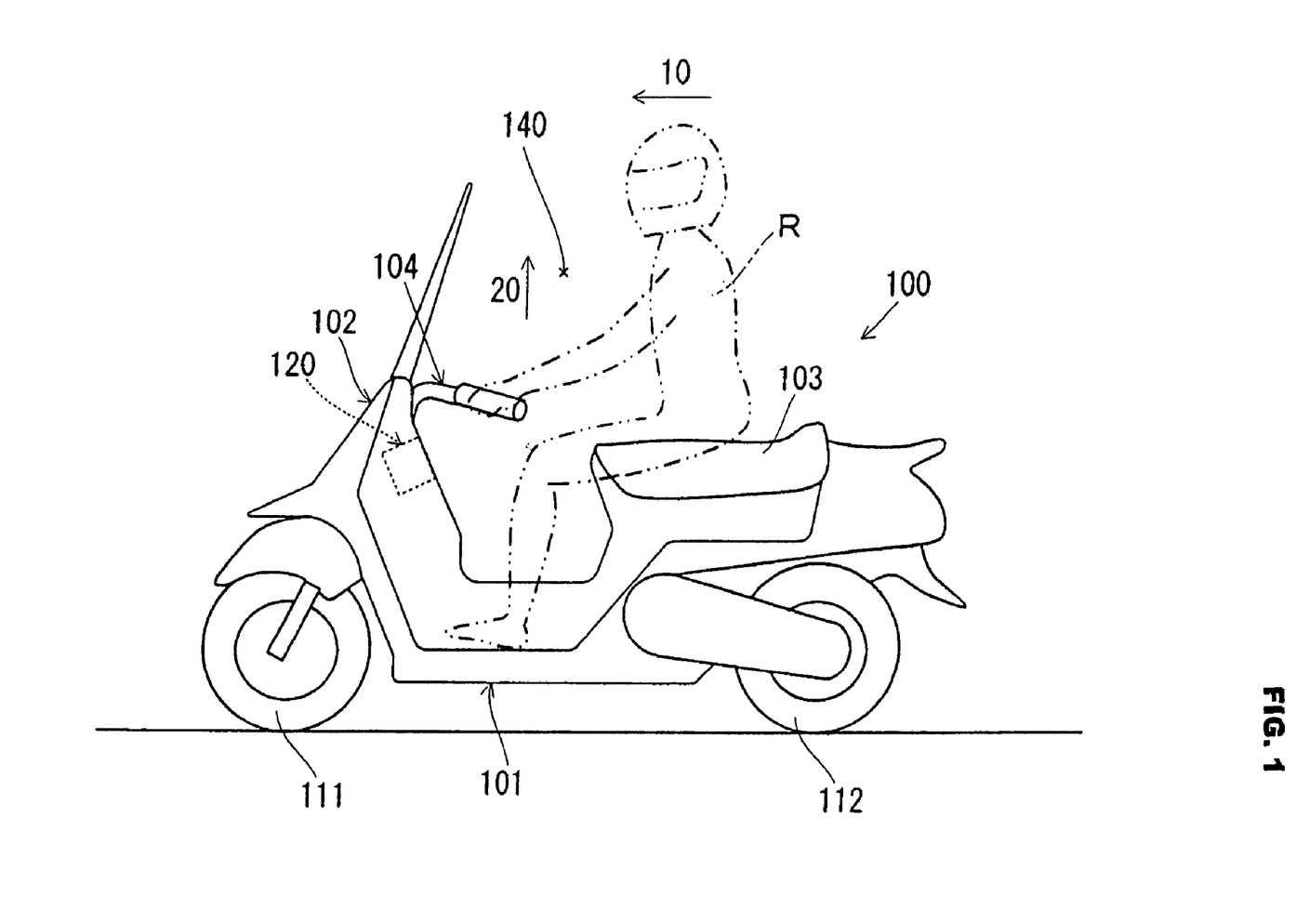
FIG. 1 is a side view of a scooter-type motorcycle 100 according to the present embodiment, showing a state in which an airbag apparatus 120 is mounted to the motorcycle 100.
Figure 2:
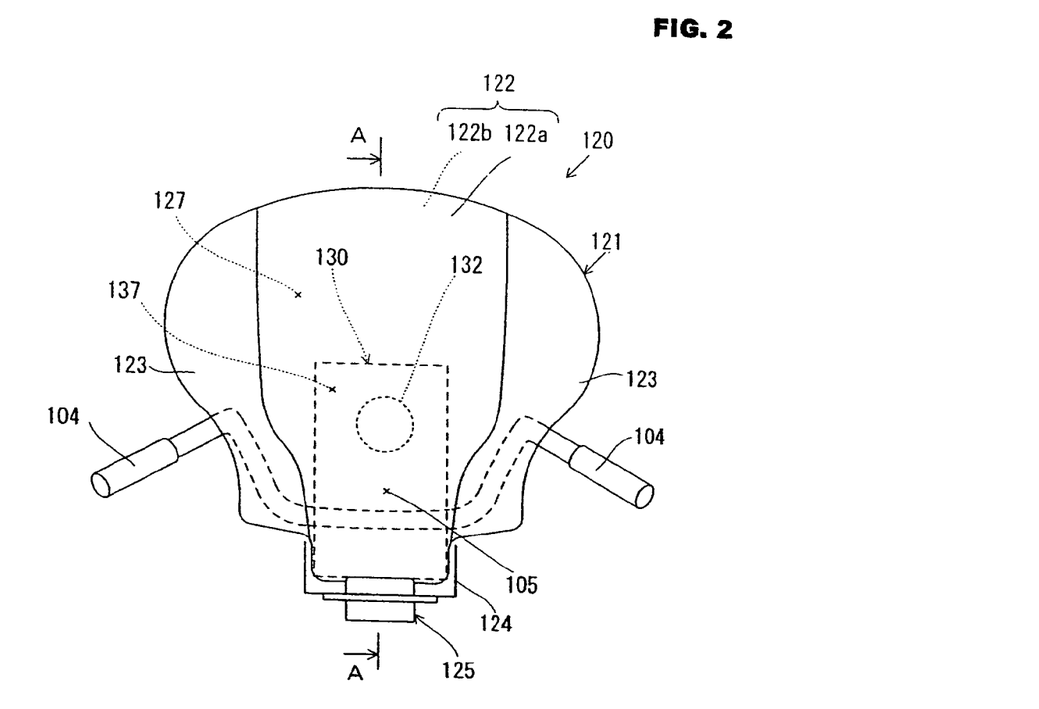
FIG. 2 a drawing showing a configuration of the airbag apparatus 120 in FIG. 1, in a state in which an airbag 121 after deployment and inflation are completed is viewed from the rider.
Figure 3:
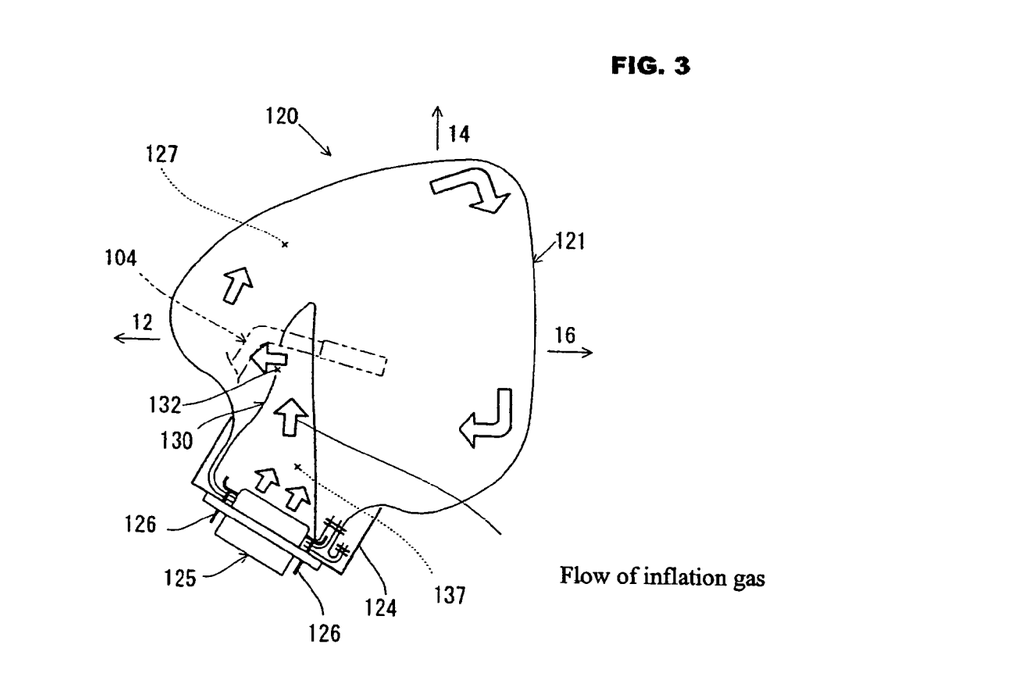
FIG. 3 is a cross sectional view taken along the line A-A in FIG. 2.
Figure 4:
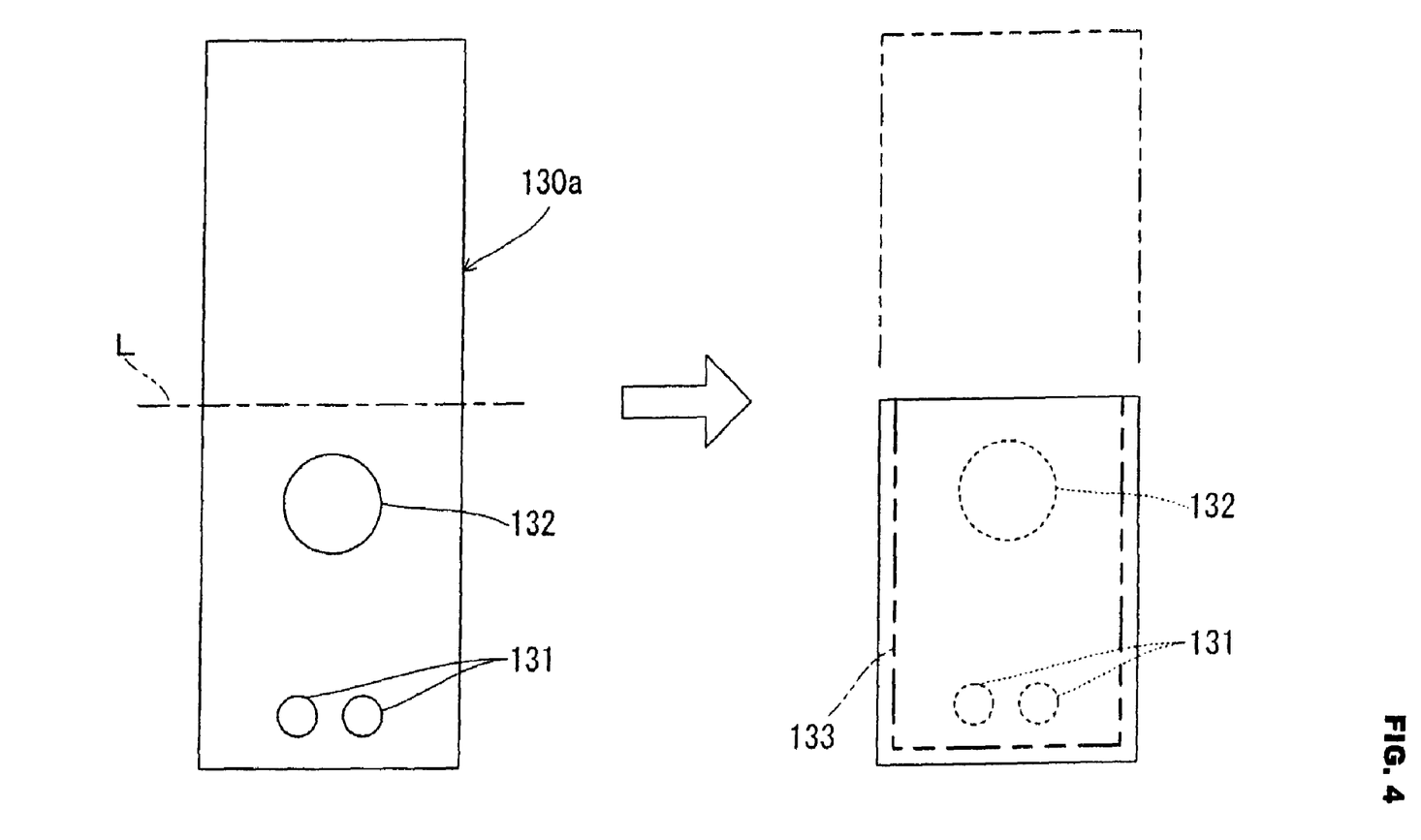
FIG. 4 is an explanatory drawing showing a configuration of a rectifying cloth 130.

Referring now to the drawings, embodiments of the present invention will be described in detail. Referring first to FIG. 1 to FIG. 4, the configuration of a scooter-type motorcycle 100 according to the present embodiment will be described. FIG. 1 is a side view of the scooter-type motorcycle 100 according to the present embodiment, showing a state in which an airbag apparatus 120 is mounted to the motorcycle 100. FIG. 2 is a drawing showing a configuration of the airbag apparatus 120 in FIG. 1, in a state in which an airbag 121 after deployment and inflation are completed is viewed from the rider. FIG. 3 is a cross sectional view taken along the line A-A in FIG. 2. FIG. 4 is an explanatory drawing showing a configuration of a rectifying cloth 130. The motorcycle 100 of the present embodiment corresponds to an example of the "motorbike" in the present invention.

As shown in FIG. 1, the motorcycle 100 is configured as a scooter composed mainly of a vehicle body structure 101 including an engine, and a main frame, a seat 103 on which a rider R can sit astride, a steering handle 104 extending laterally of the vehicle body for steering operation, a front wheel 111, and a rear wheel 112.

An area upwardly of the vehicle body structure 101 of the motorcycle 100 and the front side of the rider R is defined as a rider protecting area 140 for the case where a front collision of the motorcycle 100 is encountered. In the present embodiment, the term "front collision" widely includes a state in which the motorcycle 100 is collided with an object of collision in front thereof (not shown specifically for the sake of convenience). The term "rider protecting area 140" in the present embodiment is defined as a space, which extends in the direction forwardly of the rider R (the direction indicated by an arrow 10 in FIG. 1) for restraining and protecting the rider R from being thrown out forwardly of the motorcycle 100 when the rider R tends to be moved forwardly of the motorcycle 100 by a kinetic energy generated by the front collision.

A front portion 102 of the vehicle body structure 101 on the front side of the vehicle body is provided with an airbag apparatus 120 and various meters and switches. In particular, the airbag apparatus 120 is disposed so as to face the aforementioned rider protecting area 140 in the vicinity of the handle 104. In other words, according to the present embodiment, the airbag apparatus 120 is arranged so that the direction of projection (deployment and inflation) of an airbag 121 described later is directed upwardly toward the front of the rider R. This airbag apparatus 120 corresponds to the "airbag apparatus" in the present invention.

As shown in FIG. 2 and FIG. 3, the airbag apparatus 120 mainly includes a retainer as an airbag housing, the airbag 121 and a rectifying cloth 130 to be stored in the retainer 124 in a state of being folded in advance, and an inflator 125 for generating inflation gas. The inflator 125 corresponds to the "inflation gas supply mechanism" in the present invention.

In the present embodiment, the airbag 121 and the rectifying cloth 130 are mounted (fixed) to the retainer 124 together with the inflator 125 in a state in which the rectifying cloth 130 is disposed within the airbag 121. The airbag 121 and the rectifying cloth 130 are configured to be mounted to the retainer 124 individually via a bag ring 126. In the case where the airbag 121 and the rectifying cloth 130 are mounted to the retainer 124 individually in this manner, a reinforcing cloth for reinforcing the airbag 121 is used, though it is not shown in the drawing. The retainer 124 in this specification corresponds to the "airbag apparatus body" in the present invention.

The airbag 121 includes a main panel 122 and a pair of left and right side panels 123 to be combined with both sides of the main panel 122. The main panel 122 includes a rider-side panel cloth 122a disposed at the position facing the rider R when deployment and inflation are completed, and front-side panel cloth 122b disposed at the front side with respect to the vehicle body when deployment and inflation are completed. The airbag 121 is formed by, for example stitching each side panel 123 to both sides of the main panel 122. The airbag 121 corresponds to the "airbag" in the present invention.

The rectifying cloth 130 is a miniature bag, which is smaller than the airbag 121 in size, and stored in the airbag. The rectifying cloth 130 is formed, for example, by folding an elongated woven cloth 130a along a folding line L and stitching along the stitch line 133 into a bag shape, as shown in FIG. 4. The rectifying cloth 130 corresponds to the "bag-shaped member" or the "adjusting mechanism" in the present invention.

The rectifying cloth 130 is provided with an inlet port 131, and the inlet port 131 is connected to the inflation gas supply section of the inflator 125. The inlet port 131 is composed of two circular holes in total, and corresponds to the "inlet section" in the present invention. In the present embodiment, inflation gas can be flown into a first space 137 defined in the rectifying cloth 130 through the inlet port 131. The rectifying cloth 130 is also formed with a discharge port 132 on the wall portion on the front side with respect to the vehicle body. The discharge port 132 is composed of a single circular hole, and corresponds to the "discharge section" in the present invention. The discharge port 132 is provided at the position facing the front panel cloth 122b of the airbag 121 in a state in which the airbag 121 is deployed and inflated.

The discharge port 132 of the rectifying cloth 130 is, as shown in FIG. 2, disposed at the position facing a set-back section 105 provided at the center of the handle 104 extending laterally of the vehicle body. The set-back section 105 is a portion formed by setting back the frame portion of the handle 104 downwardly of the vehicle body. In this configuration, inflation gas flowing within the first space 137 in the rectifying cloth 130 can be discharged to a second space outside the rectifying cloth 130 through the discharge port 132. The second space 127 is a space defined between the rectifying cloth 130 and the airbag 121.

In this manner, according to the present embodiment, inflation gas generated by the inflator 125 is fed to the first space 137 in the rectifying cloth 130 through the inlet port 131, and then is flown from the first space 137 through the discharge port 132 into the second space 127 in the airbag 121.

Figure 5:
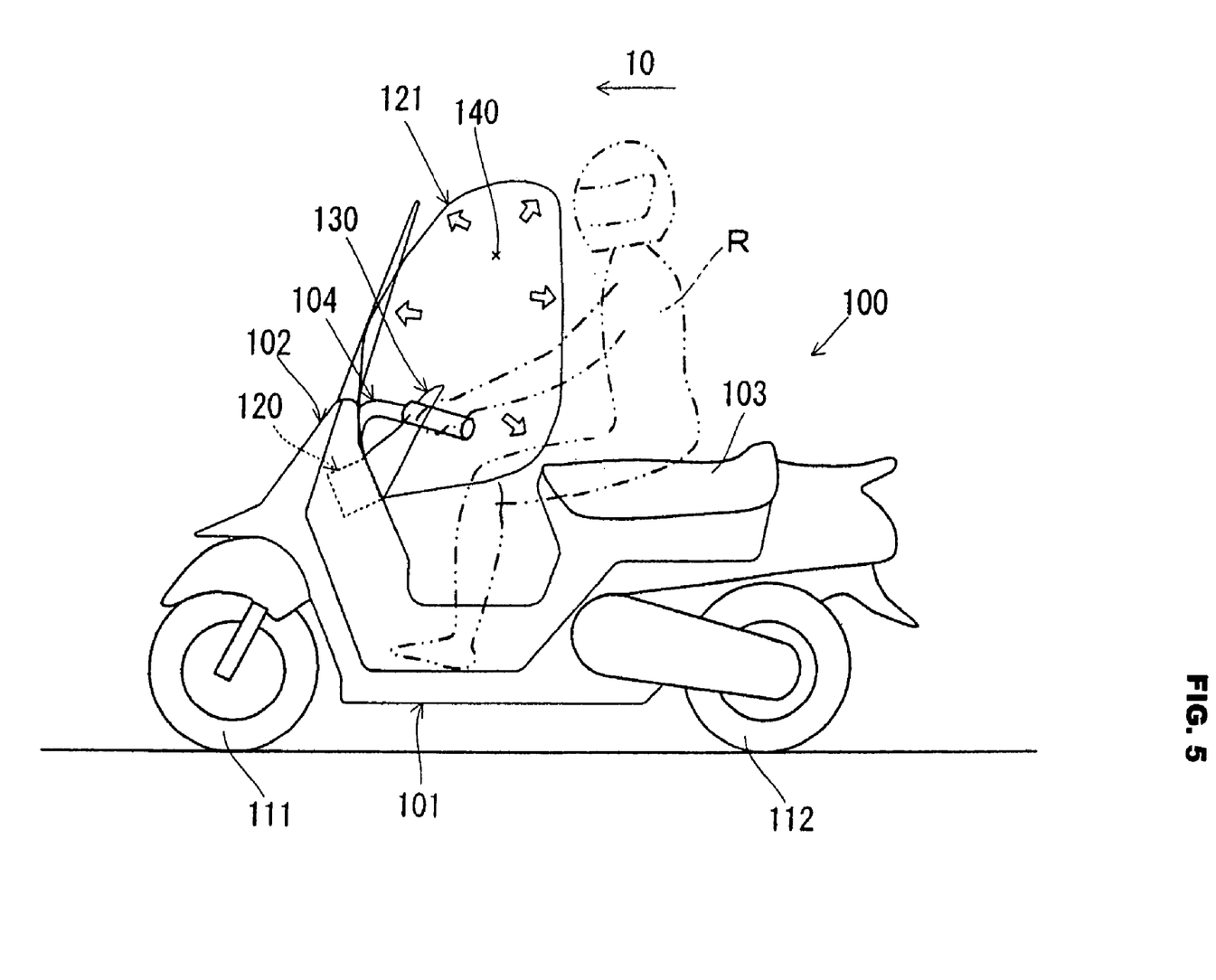
FIG. 5 is side view of the motorcycle 100, showing a state in which the deployment and inflation of the airbag 121 are completed.

Referring now to FIG. 5 in addition to FIG. 1 and FIG. 3, the motorcycle 100 according to the present embodiment arranged and manufactured as described above and the operation of the airbag 120 will be described. FIG. 5 is a side view of the motorcycle 100, and showing a state in which deployment and inflation of the airbag 121 are completed.

When the motorcycle 100 with the rider R riding thereon in the state shown in FIG. 1 collides with an object located in the direction of travel, the rider R tends to move (be thrown out) forwardly of the motorcycle 100, for example, in the direction indicated by the arrow 10 in FIG. 1. In the present embodiment, the airbag apparatus 120 is activated upon detection of the front collision and the airbag 121 initiates projection (deployment) toward the rider protecting area 140 in the direction indicated by an arrow 20 in FIG. 1.

When projection (deployment) of the airbag 121 is initiated, the folded portion of the airbag 121 projects first, and the folded portion is deployed in the projecting direction while releasing the folding toward the projecting direction. When deployment of the airbag 121 is initiated and inflation gas is fed into the space (first space 137 in FIG. 3) of the rectifying cloth 130 via the inflator 125 in the retainer 124. In other words, inflation gas generated by the inflator 125 is flown from the inflation gas supply section through the inlet port 131 into the first space 137. Accordingly, the rectifying cloth 130 is inflated, and inflation gas flown into the first space 137 is flown toward the discharge port 132, for example, in the direction indicated by an arrow in FIG. 3, and then is discharged (injected) from the discharge port 132 toward the space (second space 127 in FIG. 3) in the airbag 121. As inflation gas is discharged into the second space 127, deployment and inflation of the airbag 121 go on, and the deployed portion of the airbag 121 is enlarged in sequence.

In the present embodiment, in the process of deployment and inflation of the airbag 121, inflation gas in the first space 137 is flown toward the set-back section 105 of the handle 104 through the discharge port 132 with directivity, and is flown in the second space 127 along the inner wall surface of the airbag 121. With this flow of inflation gas, the airbag 121 is inflated in an elongated shape toward the front with respect to the vehicle body (direction indicated by an arrow 12 in FIG. 3) in a state in which expansion laterally of the vehicle body is restricted, and is inflated through the set-back section 105 at the center of the handle 104. The airbag 121 is controlled to be deployed and inflated in the sequence of forward with respect to the vehicle body (direction indicated by the arrow 12 in FIG. 3)→upward with respect to the vehicle body (direction indicated by an arrow 14 in FIG. 3)→toward the rider (direction indicated by an arrow 16 in FIG. 3). Accordingly, in the process of deployment and inflation of the airbag, deployment and inflation of the airbag 121 toward the rider are restricted in the process of deployment and inflation of the airbag 121, and the airbag 121 provides a sufficient drag for restraining the rider when the deployment and inflation of the airbag 121 are completed, so that intensive protection of the rider is achieved.

As described above, according to the present embodiment, by preferably setting the position of the discharge port 132 of the rectifying cloth 130, the direction of the inflation gas flowing from the first space 137 into the second space 127 is controlled in the process of deployment and inflation of the airbag 121, whereby the flowing state (flowing direction) of inflation gas flowing within the airbag 121 can be adjusted. Therefore, by employing the airbag 121 provided with the rectifying cloth 130 of the present embodiment, the airbag 121 is ensured to be deployed and inflated finally as a matter of course, and in addition, how the airbag 121 is deployed and inflated in the process can also be controlled. For example, by controlling the direction of deployment and inflation of the airbag 121, the mode of deployment and inflation of the airbag 121 can be determined in accordance with the behavior of the rider in case of a front collision of the motorcycle 100.

In this manner, deployment and inflation of the airbag 121 are completed, and the inflated portion of the airbag 121 as shown in FIG. 5 is formed in the rider protecting area 140. In this state in which the airbag 121 is completely deployed and inflated, the inflated portion of the airbag 121 fills up the rider protecting area 140, and the rider R who tends to be moved in the direction indicated by the arrow 10 by a kinetic energy generated by the collision is retained and restrained reliably in the rider protecting area 140 so as to prevent the rider R from being thrown up forwardly of the motorcycle 100. In particular, when the airbag apparatus 120 is mounted to the vehicle body opened in all direction, such as the motorcycle 100, intensive protection of the rider in case of accident is achieved by controlling the direction of deployment and inflation of the airbag 121, and restricting deployment and inflation toward the rider.

The present invention is not limited to the above-described embodiments, and various applications or modifications may be contemplated. For example, the following forms, which are modifications of the above-described embodiments, are also applicable.

Figure 6:
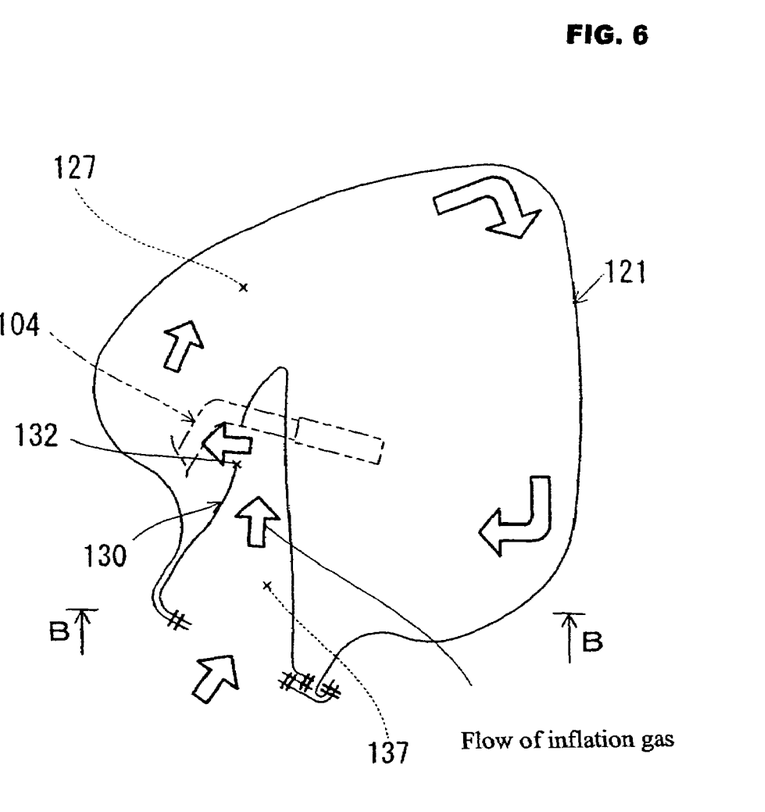
FIG. 6 is a cross-section of the airbag 121, showing another embodiment relating to the mounting method of the rectifying cloth 130.
Figure 7:
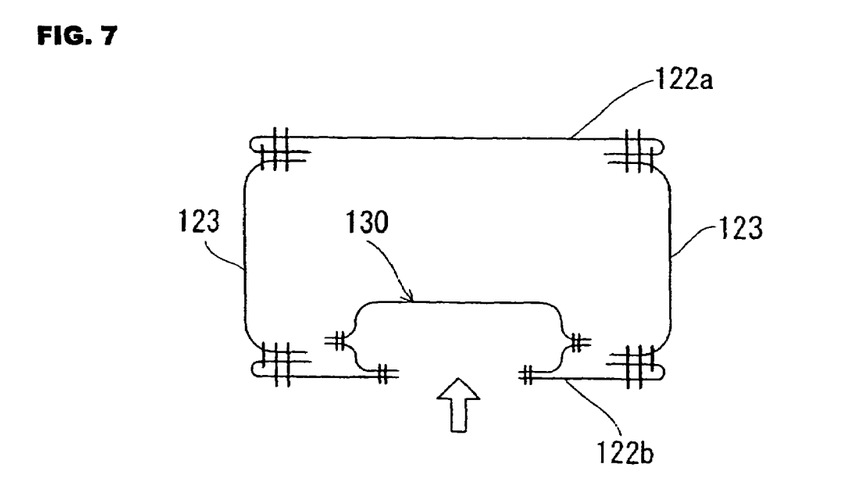
FIG. 7 is a cross-section taken along the ling B-B in FIG. 6.

While the case in which the airbag 121 and the rectifying cloth 130 are mounted individually to the retainer 124 has been described in the above-described embodiments, for example, a mounting method as shown in FIG. 6 and FIG. 7 can also be employed. FIG. 6 is a cross-section of the airbag 121, showing another embodiment relating to the mounting method of the rectifying cloth 130. FIG. 7 is a cross-section taken along the ling B-B in FIG. 6.

In the embodiment shown in FIG. 6 and FIG. 7, the airbag 121 and the bag-shaped member 130 are integrally joined with each other by stitching, and then mounted to the retainer 124, which corresponds to the airbag apparatus body. In this configuration, the reinforcing cloth for reinforcing the airbag 121 can be omitted, and hence it is effective for reducing the number of components. In addition, assembling operation of the airbag 121 can be simplified.

In the above-described embodiment, the case in which the adjusting mechanism for adjusting the flowing state (flowing direction) of inflation gas flowing in the airbag 121 is configured by the use of the rectifying cloth 130 formed into a bag-shape has been described. However, other mechanism may be used as the adjusting mechanism instead of the rectifying cloth 130. For example a configuration using a cylindrical member formed of woven cloth, or a configuration in which the woven cloth strip is stitched so as to form a route of a desired shape for inflation gas flowing in the airbag 121 may also be employed. With such configuration as well, the quantity of state relating the flow of inflation gas, such as the direction of flow, the flow rate, and the pressure of inflation gas flowing within the airbag 121 can be adjusted as needed.

In the embodiment described above, the case in which the discharge port 132 provided on the rectifying cloth 130 is formed of a single circular hole has been described. However, the shape, number and size (inner diameter) of the discharge port 132 may be changed variously as needed. For example, by employing a configuration in which a plurality of discharge sections are provided on the rectifying cloth 130, or a configuration in which the size (inner diameter) of the discharge section is variously changed, the direction and timing of deployment and inflation of the airbag 121, and time required until inflation is completed can be desirably controlled.

Although the motorcycle 100 of a scooter type has been described in the embodiments described above, the present invention can be applied to other types of motorbike.

According to the present invention, an airbag configuration technology which contributes to intensive protection of the rider of motorbike in case of accident, and other technologies related thereto are provided.

What is claimed is:

1. An airbag apparatus for being mounted to a motorbike, the airbag apparatus comprising:
   an airbag for being deployed in a motorbike collision and having an internal space that is inflated as the airbag is deployed;
   an inflator for supplying inflation gas into the airbag internal space;
   a bag-shaped member in the airbag internal space with the bag-shaped member defining an internal space that is generally isolated from the airbag internal space so that prior to substantially full inflation of the airbag internal space the bag-shaped member therein is fully inflated receiving inflation gas from the inflator in a generally upward direction therein to provide sequential inflation of the bag-shaped member space and the airbag space;
   forward, upper and rear wall portions of the airbag that face in corresponding forward, upper and rearward directions upon airbag inflation;
   forward, upper and rear wall portions of the bag-shaped member corresponding to the forward, upper and rear wall portions of the airbag and spaced therefrom with the airbag inflated; and
   a single discharge port of the bag-shaped member in the forward wall portion thereof with the upper and rear wall portions thereof lack discharge ports such that directional inflation of the airbag substantially occurs sequentially with gas from the inflator flowing through the interior space of the bag-shaped member and out from the single discharge port into the airbag interior space in the forward direction to space the airbag forward wall portion from the bag-shaped member forward wall portion, then upwardly to space the airbag upper wall portion from the bag-shaped member upper wall portion, and finally rearwardly to space the airbag rear wall portion from the bag-shaped member rear wall portion.

2. The airbag apparatus of claim 1 wherein the bag-shaped member has an elongate configuration when inflated including opposite closed end portions with one end portion being a lower wall portion of the bag-shaped member having an inlet port adjacent the inflator and the other end portion being the upper wall portion of the bag-shaped member having the discharge port in the forward wall portion adjacent thereto to define a unidirectional flow path of gas through the internal space of the bag-shaped member and out into the internal space of the airbag.

3. The airbag apparatus of claim 1 wherein the airbag and the bag-shaped member each have a bag-shaped wall that extends away from the inflator in spaced relation to each other as the airbag is deployed and inflated.

4. The airbag apparatus of claim 3 wherein the bag-shaped member has an inlet portion that is adjacent to the airbag and the inflator.

5. The airbag apparatus of claim 1 wherein the bag-shaped member comprises a closed periphery thereof and includes at least one inlet port and the single discharge port therein.

6. The airbag apparatus of claim 5 wherein the bag-shaped member has a fold and stitches along the closed periphery thereof.

7. The airbag apparatus of claim 1 including a retainer and a mounting member that fixes the bag-shaped member to the retainer without requiring stitching of the bag-shaped member to the airbag.

8. The airbag of claim 1 in combination with the motorbike having a seat and a steering handle forwardly therefrom with the steering handle having a central recessed section, and
a retainer for the airbag mounted to the motorbike so that upon airbag deployment the single discharge port of the bag-shaped member is disposed above the central recessed section of the steering handle.

9. A motorbike having an airbag apparatus, the motorbike comprising:
a generally open body generally having forward and rearward ends thereof;
a seat for a rider intermediate the body ends;
a steering handle forwardly of the seat along the body and extending laterally across the body;
a central recessed section of the steering handle having laterally opposite ends;
upwardly extending portions of the steering handle that extend upwardly from the opposite ends of the recessed section to form a laterally extending gap therebetween,
an airbag for being deployed and inflated in a rider protection area forwardly of the seat in the event of a motorbike frontal collision;
an inflator for supplying inflation gas into the airbag; and
an adjustment mechanism that adjusts inflation of the airbag by the inflation gas in the rider protection area so that the airbag initially is inflated in a generally forward direction along the body away from the rider upon deployment thereof and through the gap between the upwardly extending portions of the steering handle;
wherein the adjustment mechanism comprises a bag-shaped member including an inlet section and a discharge section and which is configured to substantially confine gas flow therethrough between the inlet and discharge sections.

10. The motorbike of claim 9 wherein the inlet section of the bag-shaped member is adjacent the inflator so that the bag-shaped member is inflated prior to gas flow into the airbag for airbag inflation.

11. The motorbike of claim 9 including:
a retainer for the airbag and bag-shaped member therein that is mounted below the central recessed section of the steering handle and the rider protection area with the bag-shaped member being sized to position the discharge section thereof above the central recessed section the steering handle in general vertical alignment with the steering handle gap upon airbag deployment.

12. The motorbike of claim 9 wherein the airbag and bag-shaped member each include corresponding forward, upper, and rearward wall portions and the discharge section comprises a port on the forward wall portion of the bag-shaped member.

13. The motorbike of claim 12 wherein the upper and rearward wall portions of the bag-shaped member lack discharge openings so that directional inflation of the airbag occurs sequentially with the airbag inwardly inflating forwardly then upwardly and finally rearwardly toward the rider.

14. The motorbike of claim 12 wherein the corresponding forward, upper and rearward wall portions of the airbag and bag-shaped member are spaced from each other when the airbag and bag-shaped member are inflated.

15. The motorbike of claim 12 wherein the airbag and the bag-shaped member wall portions are not connected to each other.

16. The motorbike of claim 12 wherein the airbag and the bag-shaped member each include a corresponding lower wall portion that are adjacent to each other and the inflator.

17. The motorbike of claim 16 wherein the bag-shaped member lower wall portion includes the inlet section which comprises at least one inlet port formed in the lower wall portion.

18. The motorbike of claim 16 including a retainer for the airbag and a mounting member that connects the lower wall portions of the airbag and bag-shaped member to the retainer.

19. The motorbike of claim 16 wherein the airbag and bag-shaped member are stitched together along the corresponding lower wall portions thereof.

20. The motorbike of claim 12 wherein the discharge port of the bag-shaped member is disposed vertically above the central recessed section of the steering handle as gas flows forwardly through the discharge port.

* * * * *